Sept. 6, 1932.   R. R. WEDDELL   1,875,967
ADJUSTABLE LOCK TOOL HOLDER
Filed March 13, 1928
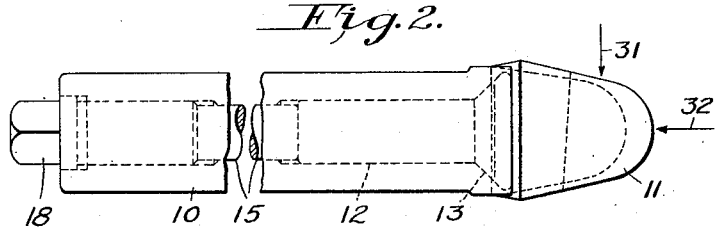
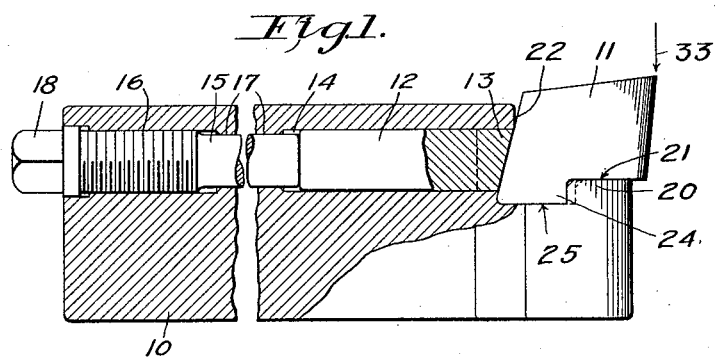 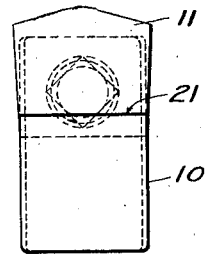
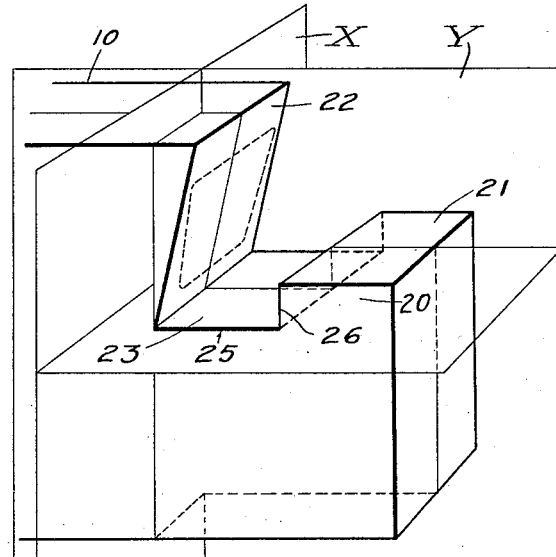 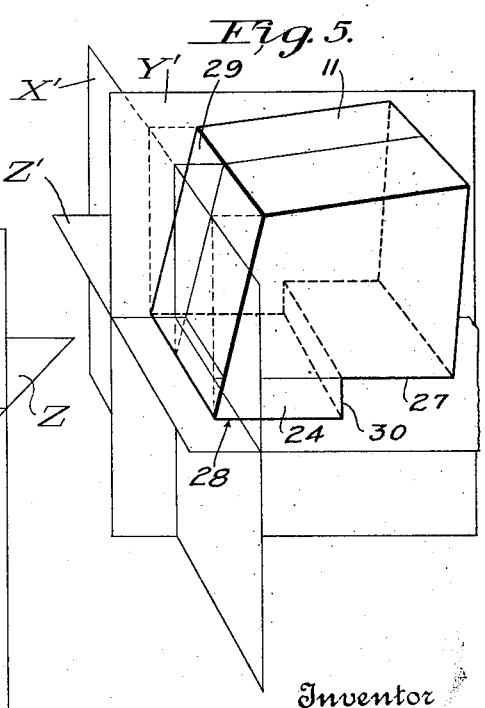
Inventor
Ralph R. Weddell
By Attorneys
Nathan & Bowman Patented Sept. 6, 1932

1,875,967

UNITED STATES PATENT OFFICE

RALPH R. WEDDELL, OF SHELTON, CONNECTICUT, ASSIGNOR TO THE O. K. TOOL COMPANY, INC., OF NEW YORK, N. Y., A CORPORATION OF NEW YORK

ADJUSTABLE LOCK TOOL HOLDER

Application filed March 13, 1928. Serial No. 261,205.

With the advent of and gradual improvement in high speed alloys for cutting tools with their characteristic properties of being difficult to machine, and initially expensive it was early conceived that a cutting tool could be made of two major parts with great advantage. Such a tool included a supporting member and a removable cutter bit adapted to be secured thereon. Each part possessed the properties particularly adapted to the functions to be performed. For example, the body member would be made of a tough, strong material relatively easy to machine, whereas the cutter bit was extremely hard, capable of taking a smooth sharp cutting edge and withstanding extremely high temperatures. As the alloys became more improved and capable of withstanding more severe cutting conditions, the machine tools were correspondingly increased in strength and capacity, the limiting element in every case being the strength and rigidity of the cutting tool. The primary difficulty encountered, therefore, was the fact that making the cutting bit removable necessarily resulted in a sacrifice in general strength and rigidity which became more and more serious as the work imposed thereon became greater with continued improvements in metals employed and the general construction of the machine.

The present invention is designed to provide improved means in this highly refined field capable of securing the cutter bit in the supporting member in a rigid manner heretofore not accomplished in similar devices.

It is further desirable in cutting tools having removable and adjustable bits that the arrangement be such that these functions may be acomplished as easily and in as quick a manner as possible. The present invention has as a part of its objects the purpose of providing for these functions in a most efficient manner.

The features of making a cutter bit adjustable and quickly removable have heretofore been accomplished in various ingenious manners by the employment of keys, locking pins and screw devices, but in most instances with a serious loss of general compactness and rigidity of the cutting tool as a whole.

The present invention accomplishes the desired functions with a minimum number of parts, which coact in a manner to result in a cutting tool which closely approaches that of a solid, single piece cutting tool.

The arrangement is such that the cutter bit rests on a substantial platform-like bearing surface and is secured in position thereon by a combined wedging and dovetailing means. The cutter bit is further secured thereon by a locking member movable directly into engagement with an inclined rear wall which cooperates with and adds to the effectiveness of the compound securing means.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, the drawing depicting a preferred typical construction has been annexed as a part of this disclosure and, in such drawing, like characters of reference denote corresponding parts throughout all the views, of which:—

Figure 1 is a side elevational view of a cutting tool partly in section embodying the present invention; Fig. 2 is a plan view thereof; Fig. 3 is an end elevational view looking from the right in Fig. 1; and Figs. 4 and 5 are straight line somewhat diagrammatic views of the shank member and the cutter bit respectively, designed to illustrate the relation of the various bearing surfaces by the employment of reference planes.

The general features of the construction exemplifying this invention include a body or shank member 10 adapted to support the cutter bit 11 at the outer end thereof. The cutter bit is locked in position thereon by means of the plunger 12 having integral therewith the abutment portion 13 engaging the cutter bit 11. The plunger 12 operates in central bore 14 of the shank 10, the bore being shaped to conform with the plunger 12 and its abutment 13. At the opposite end of the shank from the cutter bit is a stud 15 screw threaded at 16 into the body member, the inner end of the stud having a bearing in the shank at 17. A squared end 18 permits the adjustment of the stud by means of a wrench in the usual manner.

The cutter bit is rigidly secured in position on the body member by an arrangement of coacting surfaces forming a compound wedging and dovetailing means and is further secured thereon by means of the locking abutment 13 being caused to firmly engage the rear face of the cutter bit 11.

In Figs. 4 and 5, the body member and cutter bit 11 have been laid out with respect to three normal reference planes in order that the relation of the coacting bearing surfaces may be more clearly illustrated. These planes comprise in Fig. 4 the vertical planes X and Y and the horizontal plane Z, and in Fig. 5 the corresponding planes X', Y' and Z'.

The cutter bit occupies a cutaway portion at the outer end of the shank, the construction resulting in a raised platform portion 20, having the upper bearing surface 21. The back-stop face 22 of the cutaway opening is as shown inclined upwardly and outwardly toward the platform 21. A valley or recess 23 is provided for receiving the projecting portion 24 of the cutter bit. The lower bed surface of the valley 23 is parallel with the platform surface 21, the forward side wall thereof being as shown perpendicular to the surfaces 21 and 24 but, as will appear this may be undercut if desired to form an acute angle with the bed 25.

The back-stop face 22 is normal to the vertical axial plane Y, is inclined downwardly at an acute angle with the vertical transverse plane X and extends a short distance below the horizontal platform plane Z and a greater distance above it. The fore-stop face 26 is normal to the horizontal platform plane Z, is inclined at an acute angle with the vertical plane X, and extends a short distance below the horizontal platform plane Z. The valley bed 25 underlies and is parallel to the horizontal platform plane and tapers from one side to the other thereof. The platform surface 21 should have an area not materially less than the area of the valley bed 25.

The cutter bit 11, as shown in Fig. 5 is provided with similar plane surfaces including the bearing surface 27 lying in the horizontal plane Z' adapted to rest on the platform surface 21. The portion 24 projects below the horizontal plane Z' and has a lower bearing surface 28 adapted to bear on the valley bed 25. The stop faces 29 and 30 of the cutter bit correspond to the back-stop face 22 and fore-stop face 26 respectively of the shank member.

The construction outlined results in a tongue 24 receiving a wedging fit transverse to the shank in a plane parallel to the horizontal plane Z and is dovetailed against vertical movement by the inclined back-stop faces 22 and 29. Such an arrangement serves to draw the cutter bit down into firm engagement with the platform surface 21 and the valley bed 25. In this position the plunger 12 and the abutment 13 by operation of the screw stud are advanced to firmly lock the cutter bit in position. If desired, the cutter bit may be adjusted transversely of the holder, the forward abutment providing a large forward locking surface well adapted to secure it in any adjusted position.

The tool shown herein is commonly known as a right-hand cutting tool in which the forces in general act as shown by the arrows 31 and 32 in Fig. 2. In such a tool the transverse recess diverges outwardly in an upward direction as shown in Fig. 2. If the cutter tool were to be a left hand tool the taper would extend in the opposite direction in order that the normal side forces thereon would tend to force the cutter tool into more firm wedging engagement.

The substantial rear inclined faces 22 and 29 provide a very rigid securing means well adapted to resist the extreme cutting forces acting normally in the direction of arrow 33 in Fig. 1. As may be seen the dovetailing and wedging means cooperate to form a compound locking means, that is the tighter the cutter bit is wedged transversely the more firmly the dovetailing means operates, and conversely the more the rear of the cutter bit tends to lift from its seat the tighter the transverse wedging means becomes. The forward face of the abutment 13 constitutes the major portion of the back-stop face and is, therefore, equally effective in adjusted position of the cutter bit 11, if such adjustment is desired.

The arrangement and cooperation of the surfaces results in a securing means for a cutter bit which renders the tool practically as rigid as a solid, single piece cutting tool. At the same time, it is apparent that the cutter bit can be quickly removed and replaced with a minimum amount of manipulation of locking elements.

Without further analysis, the foregoing will so fully reveal the gist of this invention that others can, by applyng current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A cutter for machine tools combining a supporting shank having a cutaway portion at the outer end presenting a supporting platform surface for a cutter bit and a tapered recess back of and adjacent said platform surface; an adjusting member forming substantially the rear wall of said recess opposite to the side adjacent said platform; means for adjusting said member forwardly to vary the width of said recess; a cutter bit adapted to rest on said platform and having a projection engaging in and closely conforming to the shape of said recess, said projection and the opening formed by said member and said side adjacent the platform diverging outwardly toward the cutting edge of said bit in a direction parallel to said platform surface whereby said cutter bit may be inserted from said side and be wedged in place, and said opening and projection also being shaped to form a dove-tail acting transversely to said platform surface to lock the cutter bit thereon.

2. A cutter for metal cutting tools combining a supporting shank having a horizontally disposed cutter bit platform of relatively large proportions at the outer end thereof and a tapered recess extending below and adjacent the rear of said platform; an adjusting member having a relatively large forward face forming the rear wall of said recess; means for forwardly adjusting said member and thereby said rear wall; a cutter bit adapted to rest on said platform whereby the major cutting forces are supported by said platform, said cutter bit having a projection extending into and conforming exactly to the shape of said recess, said recess and projection being tapered in two directions with the side walls uniformly diverging outwardly toward the cutting edge of said bit, said recess also extending parallel to said platform surface and with the side walls diverging downwardly in the recess in a transverse direction to form a dove-tailing lock.

3. A cutter for machine tools combining a supporting shank having a cutaway portion at the outer end presenting a supporting platform surface for a cutter bit and a recess back of and adjacent said platform surface; a clamping member slidable in a longitudinal bore in said shank and having a relatively large forward bearing face forming the rear wall of said recess; a cutter bit adapted to rest on said platform and having a projection engaging in and closely conforming to the shape of said recess, the side walls of said recess and projection diverging outwardly to that side of said shank at which the cutting edge of the cutter bit is located, said recess extending parallel to said platform surface whereby said cutter bit may be inserted from said side and be wedged in place and forced therein by the cutting action, said side walls also being arranged to form a dove tail acting transversely to said platform surface to lock the cutter bit thereon; and means for forwardly adjusting said member to firmly engage said cutter bit.

4. A cutter for metal cutting machine combining a supporting shank having a cutaway portion at the outer end presenting a supporting platform surface for a cutter bit and a recess back of and adjacent said platform surface; a member forming substantially the rear wall of said recess, said rear wall including said member providing a large bearing surface extending above and inclined forwardly towards said platform; means for forwardly adjusting said member longitudinally of said shank; and a cutter bit adapted to rest on said platform and having a projection engaging in and conforming exactly to the shape of said recess, the side walls of said recess and projection diverging outwardly to the cutting side of said cutter tool in a direction parallel to said platform surface whereby said cutter bit may be inserted from said side and be wedged in place, and said side walls also being arranged to form a dove-tail acting transversely to said platform surface to lock the cutter bit thereon.

5. A lathe tool combining a supporting shank having a cutter bit platform at the outer end thereof and a recess extending below said platform at the rear thereof, said recess being tapered transversely of said shank with its sides constantly diverging outwardly to one side of said shank and having a rear wall extending above and inclined toward said platform; a cutter bit adapted to rest on said platform whereby the major cutting forces are supported by said platform, said cutter bit also engaging said inclined wall and having a portion extending into and conforming to the shape of said recess, said portion of said bit and the walls of said recess converging away from the cutting edge of said bit; and a locking member forming part at least of said inclined wall adjustable forwardly longitudinally of said shank to vary the width of said recess and thereby the position of said cutter bit.

In witness whereof, I hereunto subscribe my name.

RALPH R. WEDDELL.

CERTIFICATE OF CORRECTION.

Patent No. 1,875,967.  September 6, 1932.

RALPH R. WEDDELL.

It is hereby certified that error appears in the printed specification of the above numbered patent requiring correction as follows: Page 3, line 72, claim 4, after "machine" insert the word tools; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.